Figure 1:
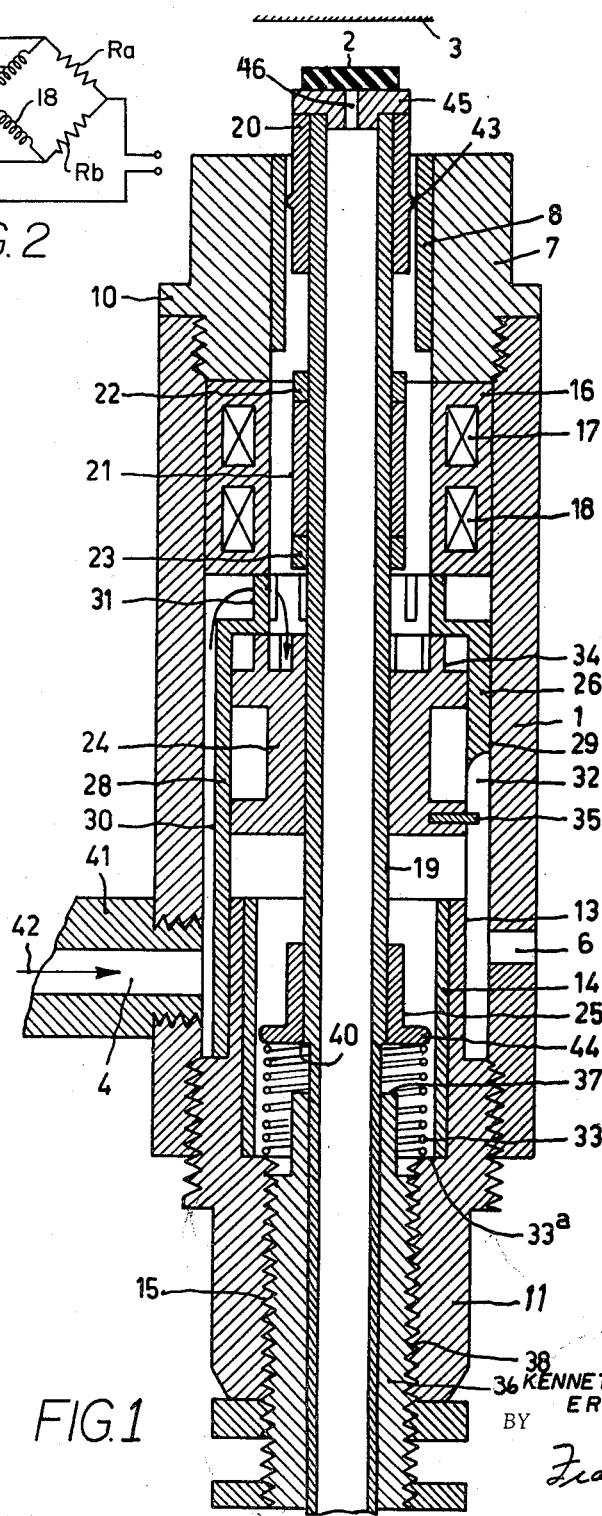

May 18, 1965

K. J. S. DONALDSON ETAL 3,183,597

ELECTROMAGNETIC THICKNESS GAUGE

Filed April 27, 1960

INVENTOR.
KENNETH J.S. DONALDSON
ERIC C. GUY
BY
Frank R. Trifari
AGENT 3,183,597
ELECTROMAGNETIC THICKNESS GAUGE
Kenneth James Stuart Donaldson, Barton-on-Sea, New Milton, and Eric Clifford Guy, Totton, Southampton, England, assignors to North American Philips Company, Inc., New York, N.Y., a corporation of Delaware
Filed Apr. 27, 1960, Ser. No. 25,121
Claims priority, application Great Britain, May 11, 1959, 16,066/59
4 Claims. (Cl. 33—169)

The invention relates to a device for measuring the thickness of objects between the head surface of a gauge pin, movable in its direction of length and a countersurface, which device comprises a holder, in which the measuring pin is journalled and means to move this pin towards the measuring position and out of this position.

Devices based on this principle are known. With the known devices use is frequently made of, for example, pinion-toothed rack transmissions or worm transmission, so that the gauge pin is mechanically connected with the means for performing the axial displacement of the gauge pin. If, with a suitable choice of sliding bearings in which the pin is axially displaceable the friction occurring in the axial displacement between the pin and the bearings is considered to be substantially negligible, such mechanical couplings will nevertheless be a source of disturbances and give rise to wear and inaccuracies in the measuring results.

A further, general disadvantage of the known devices resides in that it is often not possible, without the need for further means, to control the velocity of the movement of the gauge pin to the measuring position so that the head surface of the pin approaches the measuring position with an accurately adjustable speed. An uncontrollable approach of the measuring position therefore results in a shock-wise standstill of the gauge pin in the measuring position. Particularly with extremely vulnerable objects, for example crystals for use in diodes, an uncontrollable axial movement of the pin is highly undesirable.

The present invention has for its object to provide a device for measuring the thickness of objects, in which mechanical transmissions towards the pin and away therefrom are dispensed with and the means for performing an axial displacement of the gauge pin are constructed so that the pin can be displaced in an axial direction in a simple manner with an accurately controllable speed.

The device according to the invention is characterized in that a part of the gauge pin is adapted to co-operate electro-magnetically with electric means surrounding this pin portion so that an electric magnitude varies with the axial position of the pin with respect to the holder and that the means for the axial displacement of the gauge pin are adapted to displace this pin under the supply of a gas under pressure against spring action out of the measuring position and to move it back into the said measuring position by a gradual decrease in pressure of the supplied gas, in conjunction with the said spring action. Use is thus made of a pneumatic clutch and the displacement of the gauge pin is converted, at least for the measuring range, by electro-magnetic agency, into a measurable, electrical magnitude. The pneumatic drive is obtained by first supplying the gas under pressure to the measuring device, by interrupting subsequently this gas supply and by re-establishing this pressure not until the pressure of the supplied gas has decreased gradually. This gradual decrease in pressure of the supplied gas may be performed by causing the supplied gas to escape through leakage apertures. This provides a very simple manner of controlling the device.

Measuring devices in which use is made of pneumatic driving are known per se. However, these devices comprise a diaphragm, which is held at its periphery in a holder and with which the gauge pin is directly connected. As compared with the measuring device according to the invention such devices comprising diaphragms permit only a small stroke of the gauge pin, so that the number of uses is restricted. However, with the device according to the invention the length of the stroke may be large.

Figure 2:
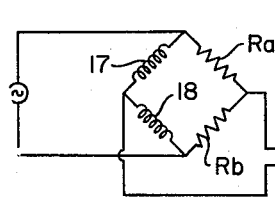

The invention will now be described more fully with reference to the accompanying drawing, in which:

FIG. 1 is a cross-sectional view of the construction embodying the invention, and FIG. 2 is a diagrammatic illustration of the bridge circuit therein.

The drawing shows part of a measuring device in which the thickness of an object 2 is measured between the head surface of a longitudinally movable gauge pin 19 and a counter-surface 3.

The measuring device comprises a cylindrical steel shell 1, which is internally tapped at the ends. Into this shell is screwed sideways a connecting piece 41, having a bore 4. Diametrically opposite the opening 5 provision is made of a leakage aperture 6.

Into the two ends of the shell 1 are screwed parts 7 and 11 respectively. These two parts are made of brass. In the part 7 is arranged a glass bearing 8 by means of an adhesive. The part 11 at the other end of the shell 1 has a cylindrical portion 13, in which a second glass bearing 14 is secured by means of an adhesive and, furthermore, a portion into which a sleeve 36 is slipped. Reference numeral 16 designates a coil holder, made from an insulating, non-magnetic material, held in place by the part 7 in the shell 1. Two relatively separated coils are arranged in the holder 16. Each of these coils is connected in a manner not shown with recording means, which are arranged outside the shell 1.

In the shell 1 is furthermore displaceable a hollow brass gauge pin 19. To this pin 19 are secured a cast steel part 20, cooperating with the bearing 8, a ferrite cylinder 21, enclosed between brass rings 22 and 23 and adapted to co-operate electro-magnetically with the coils 17 and 18, an aluminium piston 24 and a second cast steel part 25, which co-operates with the bearing 14.

Between the coil holder 16 and the part 11 is enclosed a housing 26, in which the piston body 24 secured to the pin 19 is movable. This cylindrical housing does not engage the inner side of the shell 1 throughout the external surface; the part 30 of the periphery is flat. The part 31 has a castellated structure, the top side forming a stop for the coil holder 16. In the side wall of the cylinder 26, opposite the flat side 30, a slot 32 is provided, which communicates via the leakage aperture 6 with the ambient air. Between the part 25, secured to the gauge pin 19, and the part 11 is arranged a pressure spring 33. The stroke of the piston body 24 in the cylindrical housing 26 is restricted by the castellated top side of the piston. The pressure spring 33 has a suitable face such that the piston body 24 is held in its top position under normal conditions. A pin 35 is arranged laterally in the piston 24; this pin is movable in the slot 32.

The path over which the sleeve 36 can be screwed into the part 11 is adjustable. The hollow gauge pin 19 is easily displaceable in the sleeve 36. The surface 37 constitutes the lower boundary of the stroke of the pin 19; in the lowermost position the collar 40 bears on the surface 37.

The cast steel parts 20 and 25 on the pin 19 have protruding edge parts 43 and 44, along which the pin 19 is adapted to slide in the bearings 8 and 14 in the direction of length. The radius of curvature of these edges 43 and 44 is smaller than that of the internal surfaces of the bearings 8 and 14 in order to reduce the risk of the pin 19 being jammed during its displacement.

The pin 19 is hollow and has at its top end a hardened steel lid 45, having an aperture 46.

This measuring device operates as follows:

The pipe 41 is connected with a compressed air supply and the pin 19 is connected at its bottom end with a suction duct. The coils 17 and 18 are connected in a bridge circuit so that for each different vertical position of the pin 19 with the ferrite cylinder 21 secured thereto with respect to coil holder 16 a varying electrical magnitude is obtained as a measuring value. FIG. 2 shows a known type of bridge circuit connecting coils 17 and 18 and having resistance $R_a$ and $R_b$ therein.

Compressed air is then supplied in the direction of the arrow 42. The pressure propagates via the space between the shell and the flat side 30 and between the castellations 31 to the top of the piston 24, so that the pin 19 with the parts secured thereto is moved downwards against the action of the pressure spring 33. Then the object 2 is positioned on the top side of the lid 45. This object is held in place by the suction prevailing in bore of the pin 19. The supply of compressed air is then interrupted. The compressed air in the cylinder 26 can then gradually flow away along the piston 24 through the slot 32 and the aperture 6 to the outside, so that the pressure above the piston 24 decreases. At a given instant the pressure will have dropped to such a low value that owing to the action of the pressure spring 33 the pin 19 moves upwards. During this movement the pressure of the gas above the piston decreases and the spring 33 is gradually more distended. This movement can be further controlled completely by a suitable choice of the degree of leakage and of the volume of compressed air leaving the shell via the aperture 6. The pin 19 with the object 2 to be measured will thus move upwards at a satisfactorily controlled speed and engage the counter-surface 3 with a controlled speed. At the instant of contact the measuring magnitude corresponding to the thickness of the object can be read. Then compressed air is again supplied and the pin is moved downwards, the suction in the pin 19 being overcome, the object 2 removed and the cycle described repeated with a further object.

The adhesive may be, for example, an epoxy resin hardening in the cold state.

It has been found that in the measuring device described above the gauge pin can be displaced axially in an accurately controllable manner so that the force of impact of the pin 19 on the counter-surface 3 does not exceed a given value. The final measuring pressure is also determined by the spring 33.

It appeared to be possible with the measuring device described to measure 45 crystals for use in diodes per minute in an accurate manner, the gauge pin performing each time a stroke of, for example, about 7 mms., without the pressure spring exhibiting appreciable fatigue phenomena.

What is claimed is:

1. A thickness gauge for measuring the thickness of articles held between said thickness gauge and a head surface comprising a holder, a gauge pin journalled therein, means for moving said gauge pin into and out of measuring position, electro-magnetic means, a ferrite cylinder on said gauge pin adjacent to said electro-magnetic means co-acting with the latter whereby the magnitude of the electric current varies with the axial position of said pin relative to said holder, said means for moving said gauge pin towards said head surface being a spring, and a supply of gas under pressure fed to said holder, said supply of gas being adapted to displace said gauge pin axially within said holder and against the action of said spring out of measuring position and in a direction away from said head surface, said gauge pin is moved back slowly into the measuring position towards said head surface by a gradual decrease in pressure of the supplied gas in conjunction with the action of said spring.

2. A thickness gauge for measuring the thickness of articles held between said thickness gauge and a head surface as claimed in claim 1 wherein said electro-magnet means are at least two coils which are stationary with respect to the holder.

3. A thickness gauge for measuring the thickness of articles held between said thickness gauge and a head surface comprising a holder, a gauge pin journalled therein, means for moving said gauge pin into and out of measuring position, electro-magnetic means, a ferrite cylinder on said gauge pin adjacent to said electro-magnetic means co-acting with the latter whereby the magnitude of the electric current varies with the axial position of said pin relative to said holder, said means for moving said gauge pin towards said head surface being a spring, a cylinder, a piston arranged on said gauge pin and reciprocating in said cylinder, and a supply of gas under pressure fed to said holder and exerted on one side of said piston and spring force on the other side thereof, said supply gas being adapted to displace said gauge pin axially within said holder against the action of said spring out of measuring position in a direction away from said head surface, at least one leakage aperture in said holder for the gradual decrease of pressure of gas exerted on said one side of said piston whereby said gauge pin is moved back slowly into the measuring position by said gradual decrease in pressure of the supplied gas in conjunction with the action of said spring.

4. A thickness gauge for measuring the thickness of articles held between said thickness gauge and a head surface comprising a holder, a gauge pin journalled therein, means for moving said gauge pin into and out of measuring position, electro-magnetic means, a ferrite cylinder on said gauge pin adjacent to said electro-magnetic means co-acting with the latter whereby the magnitude of the electric current varies with the axial position of said pin relative to said holder, said means for moving said gauge pin toward said head surface being a spring, and a supply of gas under pressure fed to said holder, said supply of gas being adapted to displace said gauge pin axially against the action of said spring out of measuring position and in a direction away from said head surface, bleeding means in said holder for releasing said gas slowly from said holder whereby said gauge pin is moved back slowly into the measuring position towards said head surface by a gradual decrease in pressure of the supplied gas in conjunction with the action of said spring, said gauge pin being hollow and adapted for a suction therein and having an aperture on the top portion thereof which is adapted to be closed by the article to be measured when said gauge pin moves towards said head surface and engages the underside of said article.

References Cited in the file of this patent

UNITED STATES PATENTS

| | | | |
|---|---|---|---|
| 2,548,645 | 4/51 | Ashcroft et al. | 73—45.3 |
| 2,571,161 | 10/51 | Poole | 33—174 |
| 2,596,696 | 5/52 | Knobel. | |
| 2,603,043 | 7/52 | Bontemps. | |
| 2,833,046 | 5/58 | Jeglum | 33—147 |
| 2,894,331 | 7/59 | Stratman | 33—143 |

ISAAC LISANN, *Primary Examiner.*

UNITED STATES PATENT OFFICE
CERTIFICATE OF CORRECTION

Patent No. 3,183,597                                    May 18, 1965

Kenneth James Stuart Donaldson et al.

It is hereby certified that error appears in the above numbered patent requiring correction and that the said Letters Patent should read as corrected below.

Column 2, line 58, for "face" read -- force --; column 4, line 3, after "surface," insert -- bleeding means in said holder for releasing said gas slowly from said holder whereby --.

Signed and sealed this 16th day of November 1965.

SEAL)
Attest:

ERNEST W. SWIDER
Attesting Officer

EDWARD J. BRENNER
                                              Commissioner of Patents